US009855962B1

(12) United States Patent
Chen et al.

(10) Patent No.: US 9,855,962 B1
(45) Date of Patent: Jan. 2, 2018

(54) LOCKING FLOOR FOLDING CART

(71) Applicants: Zhaosheng Chen, El Monte, CA (US); Yishun Chen, El Monte, CA (US)

(72) Inventors: Zhaosheng Chen, El Monte, CA (US); Yishun Chen, El Monte, CA (US)

(*) Notice: Subject to any disclaimer, the term of this patent is extended or adjusted under 35 U.S.C. 154(b) by 0 days.

(21) Appl. No.: 15/285,891

(22) Filed: Oct. 5, 2016

(51) Int. Cl.
*B62B 3/02* (2006.01)
*B62B 3/00* (2006.01)
*B62B 5/06* (2006.01)
*A45B 23/00* (2006.01)

(52) U.S. Cl.
CPC .............. *B62B 3/022* (2013.01); *A45B 23/00* (2013.01); *B62B 3/005* (2013.01); *B62B 5/067* (2013.01); *A45B 2023/0025* (2013.01); *B62B 2301/046* (2013.01); *B62B 2501/04* (2013.01)

(58) Field of Classification Search
CPC .......... B62B 3/022; B62B 3/00; B62B 3/002; B62B 3/02; B62B 3/025; B62B 2202/52; B62B 2205/06; B62B 3/007; B62B 5/067
See application file for complete search history.

(56) References Cited

U.S. PATENT DOCUMENTS

| | | | |
|---|---|---|---|
| 9,010,769 B1* | 4/2015 | Munive | B62B 3/144 280/33.992 |
| 9,101,206 B1* | 8/2015 | Chen | B62B 3/007 |
| 9,145,154 B1* | 9/2015 | Horowitz | B62B 3/025 |
| 2007/0089265 A1* | 4/2007 | Lin | B60B 33/0021 16/35 R |
| 2008/0238012 A1* | 10/2008 | Carter | B62B 3/02 280/47.35 |
| 2010/0090444 A1* | 4/2010 | Chen | B62B 3/007 280/651 |
| 2015/0035258 A1* | 2/2015 | Chen | B62B 3/02 280/651 |
| 2015/0151771 A1* | 6/2015 | Jin | B62B 3/027 280/651 |

* cited by examiner

Primary Examiner — Brian L Swenson
(74) Attorney, Agent, or Firm — Clement Cheng

(57) ABSTRACT

A locking floor folding cart has a pair of front wheels, a pair of rear wheels, and a folding frame. The folding frame includes a front frame supported by the pair of front wheels, and a rear frame supported by the pair of rear wheels. A front floor member is hinged to a rear floor member at a middle floor joint. The front floor member is also hinged to the front frame, and the rear floor member is also hinged to the rear frame. A floor crossbar supports the middle floor joint, the front floor member, and the rear floor member. A primary sidewall assembly supports the floor crossbar. The primary sidewall assembly includes a front floor crossbar support and a rear floor crossbar support. The front floor crossbar support is hinged to the rear floor crossbar support at a floor crossbar connector.

15 Claims, 6 Drawing Sheets

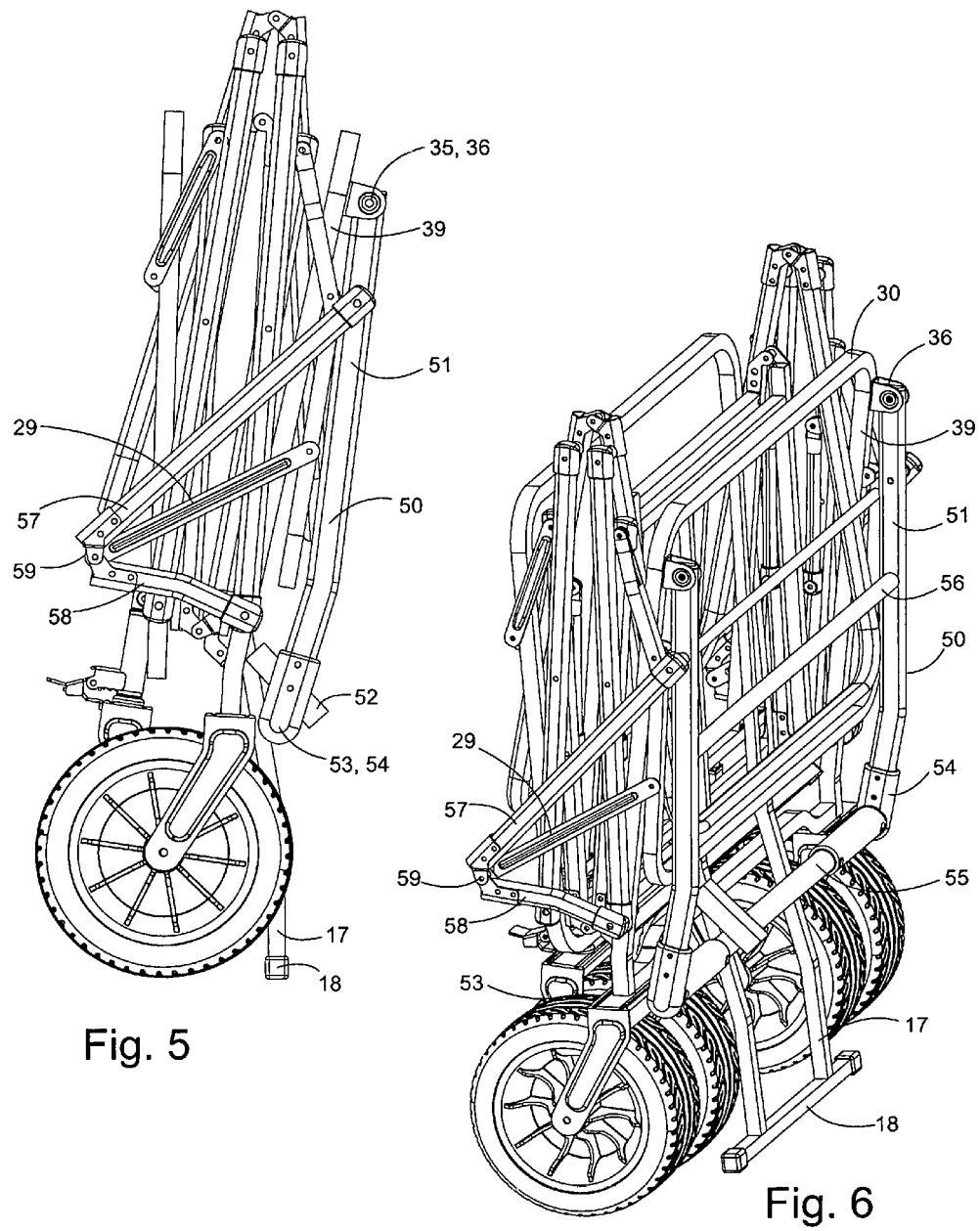

LOCKING FLOOR FOLDING CART

FIELD OF THE INVENTION

The present invention is in the field of folding carts, more precisely, a locking floor folding cart.

DISCUSSION OF RELATED ART

The pull cart has been used for transporting groceries, small children, gardening supplies and the like for many centuries. Typically, the cart has a cart bed with a handle and four wheels. The cart is multi-functional, pedestrian and generally a neighborhood vehicle. Taking the cart on camping trips, to the beach or anywhere would generally require loading it into an automobile. Because the traditional pull cart is not collapsible, the space limitations in a car may sometimes make the transportation of the cart cumbersome and difficult.

A variety of different folding carts have been created in the prior art, but inventors continue to strive to create folding carts that provide an ever higher strength to weight ratio. As an improvement to the traditional pull cart, a variety of folding versions have been invented. For example, a folding child cart as described in U.S. Pat. No. 5,957,482 filed Aug. 30, 1996 to Mr. Shorter (the disclosure of which is incorporated herein by reference) provides a cart with a transversely divided in hinged for folding from a flat position for use to a position which the two bed halves are in face-to-face contact for storage. Furthermore, the removable rail modules may be removable for storage.

Some carts are capable of folding into a small compact area. For example, Ritucci shows in U.S. Pat. No. 6,845,991, filed Mar. 17, 2003 a folding cart that has folding wheels which can be folded for storage such that the entire package appears to fold into a briefcase like module. Other inventions such as Banuelos' folding cart of application Ser. No. 09/732,556, publication number 2003/0025301 having a filing date of Dec. 8, 2000 (the disclosure of which is incorporated herein by reference) provides a net for storing cargo with the net capable of extending between the bottom panel assembly and the upper rail for forming a cargo compartment. A worldwide need for folding carts has provided a panoply of possibilities. Numerous designs having folding wheels, folding beds, and folding frames have been developed.

The same inventor Chen, Zhaosheng also invented a variety of different folding carts including carts that had table and umbrella attachments. Unfortunately, these prior art carts relied on a folding frame with a pair of leaning bars defining the foldable frame. The leaning bar configuration was not as sturdy. The folding frame also did not lock as well to an unfolded deployed position. The prior art cart also had wheels such as sand wheels. Thus, the inventor seeks to improve upon his previous inventions and improve upon the prior art. For example, same inventor Chen, Zhaosheng describes in U.S. Pat. No. 9,440,668 entitled Umbrella Folding Table Cart issued Sep. 13, 2016, the disclosure of which is incorporated herein by reference, a scissor link folding frame cart, but the old design can be improved for stability and sturdiness.

SUMMARY OF THE INVENTION

A locking floor folding cart has a pair of front wheels, a pair of rear wheels, and a folding frame. The folding frame includes a front frame supported by the pair of front wheels, and a rear frame supported by the pair of rear wheels. A front floor member is hinged to a rear floor member at a middle floor joint. The front floor member is also hinged to the front frame, and the rear floor member is also hinged to the rear frame. A floor crossbar supports the middle floor joint, the front floor member, and the rear floor member. A primary sidewall assembly supports the floor crossbar. The primary sidewall assembly includes a front floor crossbar support and a rear floor crossbar support. The front floor crossbar support is hinged to the rear floor crossbar support at a floor crossbar connector.

The floor crossbar connector is connected to the floor crossbar. The primary sidewall assembly also has a pair of primary sidewall assembly front links and a pair of primary sidewall assembly rear links. The pair of primary sidewall assembly front links are pivotally connected to the front frame at front frame upper joints and connected to the front floor crossbar supports at primary sidewall front joints, and the pair of primary sidewall rear links are pivotally connected to the rear frame at rear frame upper joints and connected to the rear floor crossbar supports at primary sidewall rear joints.

A secondary sidewall assembly supports the primary sidewall assembly. The secondary sidewall assembly includes a secondary sidewall assembly front link and a secondary sidewall assembly rear link. The secondary sidewall assembly front link is pivotally connected to the front frame at front frame lower joints, and the secondary sidewall assembly rear link is pivotally connected to the rear frame at rear frame lower joints. The front frame upper joints are mounted above the front frame lower joints. The rear frame upper joints are mounted above the rear frame lower joints.

The locking floor folding cart optionally includes a rear basket hoop pivotally mounted to a right rear frame handle joint and a left rear frame handle joint. The rear basket hoop extends from the pair of primary sidewall assembly rear links. The rear basket hoop is rigidly connected to the pair of primary sidewall assembly rear links A rear basket hoop support supports the rear basket hoop. A handle support joint supports the rear basket hoop support and is pivotally connected to the rear basket hoop support. The handle support joint is pivotally connected to a handle support upper section above the handle support joint and a handle support lower section below the handle support joint. The handle support upper section is pivotally connected to a handle for supporting the handle, and the handle support lower section is pivotally connected to the rear frame at a location below the handle support joint.

The handle pivotally is mounted to the rear frame at a right rear frame handle joint and a left rear frame handle joint. The handle includes a pair of handle extensions connected by a handle grip. The left handle joint connects to a left end of the handle grip and right handle joint connects to a right end of the handle grip. The handle can be pivotally mounted to the rear frame at a right rear frame handle joint and a left rear frame handle joint. The handle support joint locks at a angle where the handle support upper section and the handle support lower section are generally parallel to each other. The handle support joint is pivotally connected to a rear basket hoop support. The rear basket hoop support supports a rear basket hoop. The rear basket hoop is pivotally connected to the rear frame.

The rear basket hoop extends from the pair of primary sidewall assembly rear links. The rear basket hoop forms a first locking four bar mechanism with the rear frame, the rear basket hoop supports, and the handle support lower section.

The first locking four bar mechanism can fold to the folded position and deploy to the deployed position.

A pair of wheel pivot latches can be mounted to the pair of front wheels. The pair of front wheels has a pivoting mode allowing steering and a fixed mode not allowing steering. The pair of wheel pivot latches are mounted to the front frame. Additionally, an umbrella having an umbrella canopy can be mounted to an umbrella mast. The umbrella is mounted to an umbrella holder. The umbrella holder is mounted to a handle. The foot stand has a pair of foot stand extensions and a foot stand extension crossbar. The foot stand extends from and is rigidly connected to the rear floor member. The foot stand is pivotally connected to the rear frame.

The main basket has a rear main basket member and a front main basket member. The rear main basket member is supported by a pair of main basket rear supports. The front main basket member is supported by a pair of main basket front supports. The pair of main basket rear supports are pivotally connected to the primary sidewall assembly rear floor crossbar supports. The pair of main basket front supports are pivotally connected to the primary sidewall assembly front crossbar supports.

The main basket is connected at a secondary sidewall assembly middle joint. The front main basket member and the rear main basket member are connected together pivotally at the secondary sidewall assembly middle joint. The secondary sidewall assembly middle joint is supported by the secondary sidewall assembly front link and the secondary sidewall assembly rear link.

BRIEF DESCRIPTION OF THE DRAWINGS

FIG. 5 is a side view of the folding cart in folded configuration.

FIG. 6 is a perspective view of the folding cart in folded configuration.

The following call out list of elements can be a useful guide in referencing the element numbers of the drawings.

10 Floor Assembly
11 Rear Floor Member
12 Front Floor Member
13 Middle Floor Joint
14 Floor Crossbar
15 Rear Floor Joint
16 Front Floor Joint
17 Foot Stand Extension
18 Foot Stand Extension Crossbar
19 Floor Member Crossbar
20 Primary Sidewall Assembly
21 Floor Crossbar Connector
22 Primary Sidewall Assembly Rear Floor Crossbar Supports
23 Primary Sidewall Assembly Front Floor Crossbar Supports
24 Primary Sidewall Assembly Left Rear Sidewall Link
25 Primary Sidewall Assembly Left Front Sidewall Link
26 Primary Sidewall Assembly Right Rear Sidewall Link
27 Primary Sidewall Assembly Right Front Sidewall Link
28 Rear Basket Hoop
29 Rear Basket Hoop Supports
30 Rear Frame
31 Left Rear Frame Lower Joint
32 Right Rear Frame Lower Joint
33 Left Rear Frame Upper Joint
34 Right Rear Frame Upper Joint
35 Right Rear Frame Handle Joint
36 Left Rear Frame Handle Joint
37 Right Rear Frame Wheel Connector
38 Left Rear Frame Wheel Connector
39 Rear Frame Side Vertical Member
40 Front Frame
41 Front Frame Left Lower Joint
42 Front Frame Right Lower Joint
43 Front Frame Left Upper Joint
44 Front Frame Right Upper Joint
45 Front Frame Upper Horizontal Member
46 Front Frame Lower Horizontal Member
47 Front Frame Left Vertical Member
48 Front Frame Right Vertical Member
50 Handle
51 Handle Extension
52 Umbrella Holder
53 Left Handle Joint
54 Right Handle Joint
55 Handle Grip
56 Handle Cross Brace
57 Handle Support Upper Section
58 Handle Support Lower Section
59 Handle Support Joint
60 Secondary Sidewall Assembly
61 Secondary Sidewall Assembly Rear Link
62 Secondary Sidewall Assembly Front Link
63 Secondary Sidewall Assembly Rear Link Joint
64 Secondary Sidewall Assembly Front Link Joint
65 Secondary Sidewall Assembly Rear Scissor Joint
66 Secondary Sidewall Assembly Front Scissor Joint
67 Secondary Sidewall Assembly Middle Joint
70 Main Basket
71 Rear Main Basket Member
72 Front Main Basket Member
73 Main Basket Rear Left Support
74 Main Basket Rear Right Support
75 Main Basket Front Left Support
76 Main Basket Front Right Support
77 Main Basket Support Upper Joint
78 Main Basket Support Lower Joint
79 Main Basket Middle Joint
80 Umbrella
81 Umbrella Canopy
82 Umbrella Mast
83 Umbrella Canopy Panel 84 Stowage Handle
85 Stowage Handle Strap
91 Primary Sidewall Middle Joint
92 Primary Sidewall Rear Joint
93 Primary Sidewall Front Joint
94 Wheel Pivot
95 Wheel Pivot Latch

DETAILED DESCRIPTION OF THE PREFERRED EMBODIMENT

Figure 1:
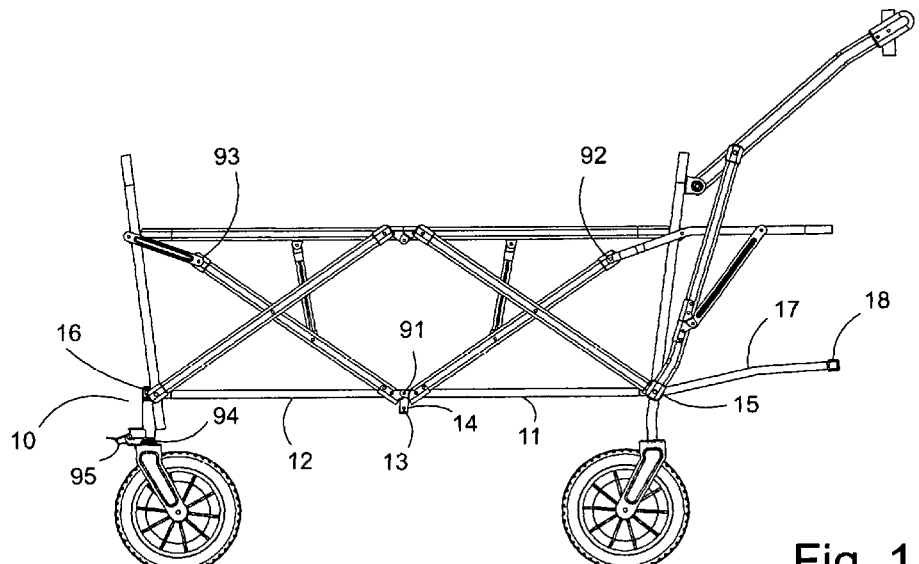
FIG. 1 is a side elevation view of the folding cart.
Figure 2:
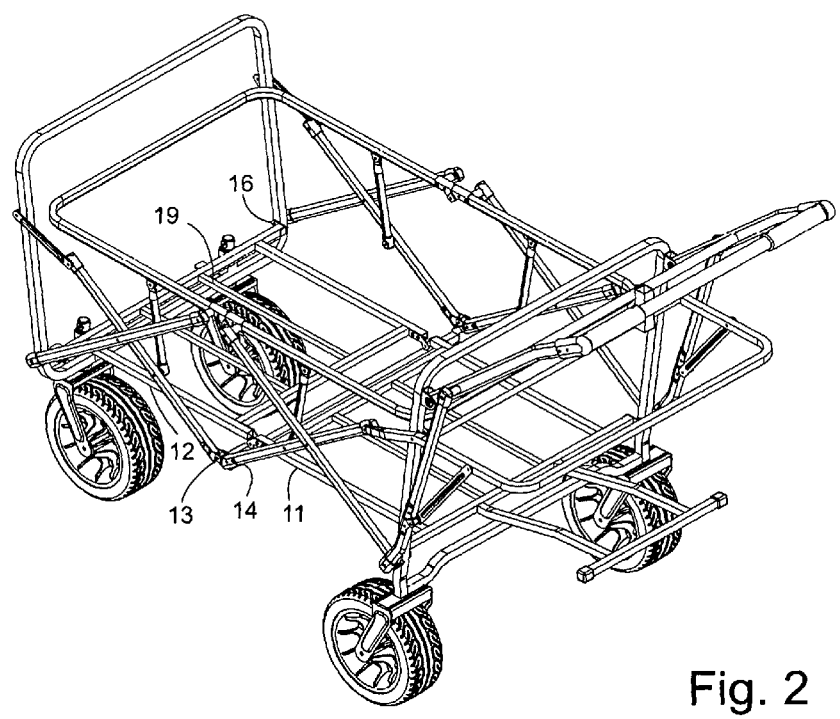
FIG. 2 is a perspective view of the folding cart in open configuration seen from a generally isometric angle.

The present invention is a folding cart with a locking floor. The cart has an open configuration when deployed and a folded configuration when stowed. The locking floor folds upward. The folding cart has a folding floor assembly 10. As called out in FIGS. 1-2, the floor assembly is formed of a pair of panels including a rear floor member 11 and a front floor member 12. The pair of panels are formed as frames of preferably welded tubular steel. When using welded tubular steel, the steel tubular members preferably have a generally rectangular cross-section and a flat upper surface opposing a flat lower surface. The rear floor member 11 is closer to the user and the front floor member 12 is further from the user in an orientation where the user is pushing or pulling the cart.

The rear floor member 11 is hinged to the front floor member 12 at a middle floor joint 13. The middle floor joint 13 can rest on a floor crossbar 14. The floor crossbar extends from the right side of the cart to the left side of the cart underneath the middle floor joint 13. The middle floor joint 13 is a portion of the folding floor assembly 10 that abuts floor crossbar 14. The floor crossbar 14 is therefore releasably engaged to the folding floor assembly 10. The middle floor joint 13 can have a locking hinge that unfolds beyond a 180° angle so that the weight of the rear floor member 11 and the front floor member 12 bias the folding floor assembly 10 into a locked position. Compressive force from rear to back would bias the middle floor joint 13 downward where the middle floor joint 13 abuts the floor crossbar 14. Instead of the middle floor joint 13 abutting the floor crossbar 14, the rear floor member 11 or the front floor member 12 could also be supported by the floor crossbar 14. The contact area can have an elastomeric cover or surface treatment to improve connection.

The rear floor member 11 is hinged to a rear floor joint 15 and the front floor member 12 is hinged to a front floor joint 16. The rear floor member 11 is rigidly connected to, such as by being welded to, a foot stand extension 17 which extends from the rear floor member 11. The foot stand extension 17 can include a foot stand extension crossbar 18 welded at a right angle to the foot stand extension 17. The foot stand extension 17 can be formed of a pair of square tube steel members that extend outwardly from the rear floor joint. Downward force on the foot stand extension crossbar 18 can unlock the middle floor joint 13 from its extended configuration past the 180° angle so that middle floor joint 13 can fold to its closed configuration. For the rear floor member 11 and the front floor member 12, several floor member crossbars 19 can be welded to form a frame having a planar configuration.

Figure 3:
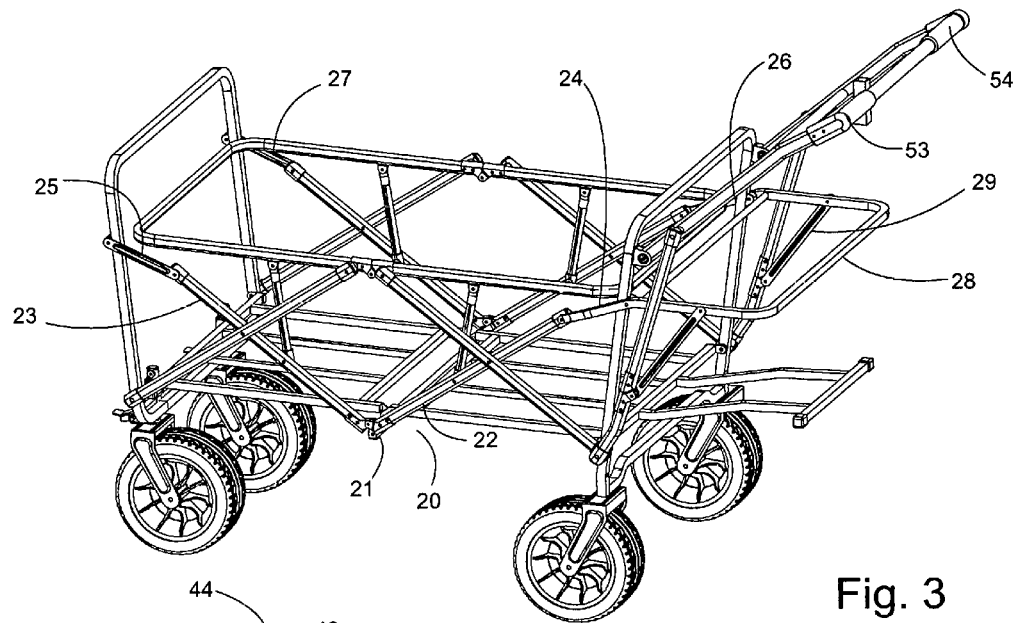
FIG. 3 is a perspective view of the folding cart in open configuration.
Figure 4:
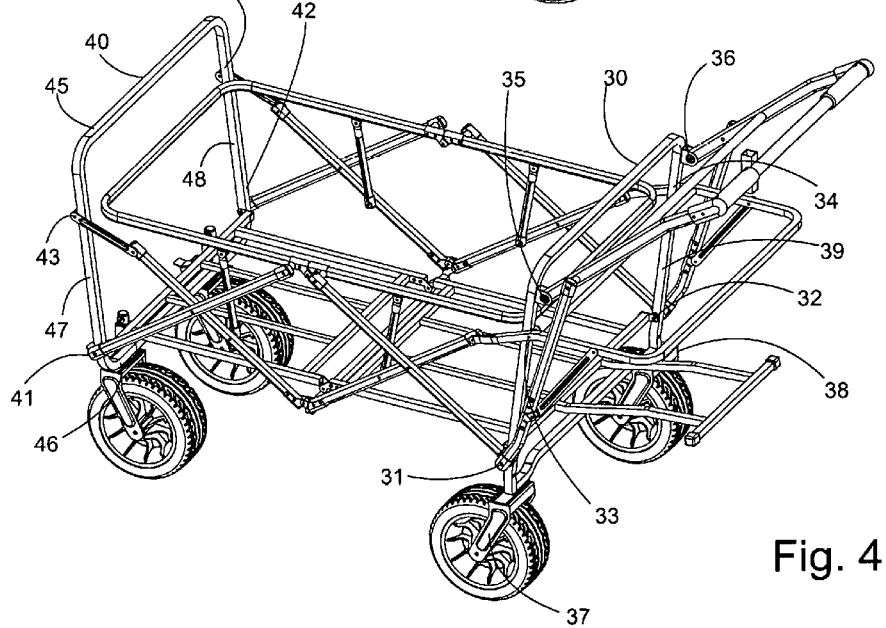
FIG. 4 is a perspective view of the folding cart in open configuration, taken from a higher angle.
Figure 7:
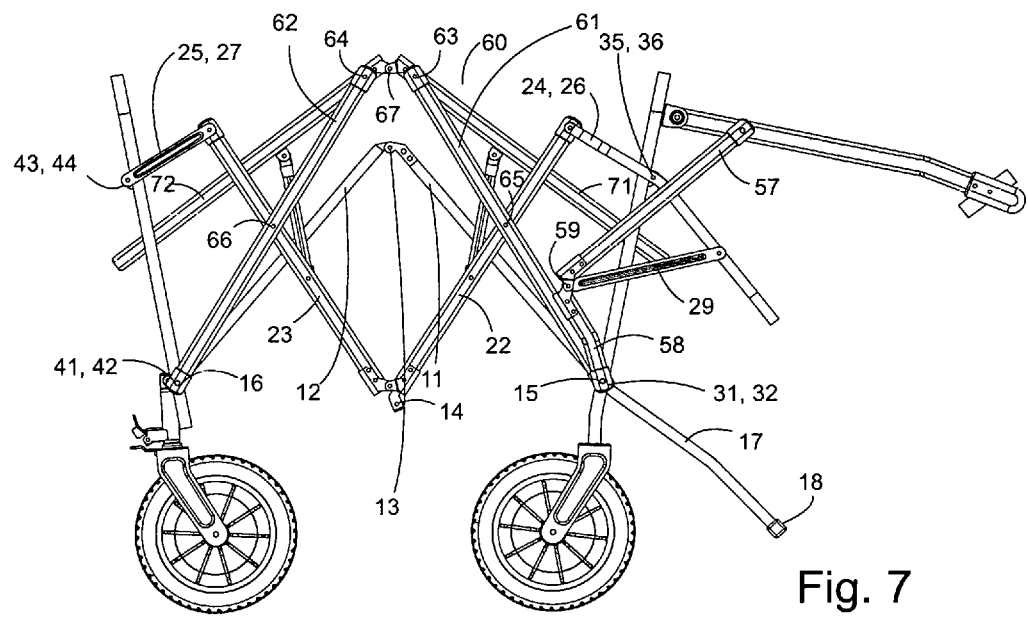
FIG. 7 is a side view of the folding cart in a half folded configuration.

The floor crossbar 14 supports the floor assembly 10, but is not a part of the floor assembly 10. Rather, the floor crossbar 14 is a part of the primary sidewall assembly 20. As called out in FIGS. 3-4, the primary sidewall assembly 20 connects to the floor crossbar 14 at a floor crossbar connector 21. A pair of primary sidewall assembly rear floor crossbar supports 22 extend diagonally from the floor crossbar connector 21 and connect to a pair of primary sidewall assembly rear sidewall links including a primary sidewall assembly left rear sidewall link 24 and a primary sidewall assembly right rear sidewall link 26. Similarly, the pair of primary sidewall assembly front floor crossbar supports 23 connect to the floor crossbar connector 21 and extend to a pair of primary sidewall assembly front sidewall links including a primary sidewall assembly left front sidewall link 25 and a primary sidewall assembly right front sidewall link 27. At the rear of the cart, the pair of primary sidewall assembly rear sidewall links extend to a rear basket hoop 28. The rear basket hoop 28 can receive a rear basket hoop fabric basket for stowing articles. The rear basket hoop fabric basket does not touch the foot stand extension crossbar 18. The rear basket hoop supports 29 are hinged to the rear basket hoop 28.

The rear basket hoop 28 is rigidly connected to and preferably integrally formed with the pair of primary sidewall assembly rear sidewall links. The pair of rear basket hoop supports 29 preferably connect to an outside surface of the rear basket hoop 28 in a pivot joint such as a rivet connection. The rear basket hoop supports 29 can be formed of steel elongated bars that are stamped or embossed for resisting torsion.

The rear basket hoop 28 is mounted to the rear frame 30 at a pivoting connection such as a rivet. As called out in FIGS. 3-4, the rear frame 30 has a generally rectangular frame structure with a pair of horizontal members connected to a pair of vertical members. Preferably, the rear frame 30 can be integrally formed of one or two bent tubular metal members. At the very least, a pair of rear frame side vertical members 39 receive a plurality of joints for connection to the sidewalls and the floor assembly 10.

The rear frame 30 has a left rear frame lower joint 31, and a right rear frame lower joint 32 that both pivotally connect to the rear floor member 11 and can also both pivotally connect to the secondary sidewall assembly rear links 61. The rear frame 30 also has a left rear frame upper joint 33 and a right rear frame upper joint 34. The left rear frame upper joint 33 is pivotally connected to and is connected between the primary sidewall assembly left rear sidewall link 24 and the rear basket hoop 28. Similarly, the right rear frame upper joint 34 is pivotally connected to and is connected between the primary sidewall assembly right rear sidewall link 26 and the rear basket hoop 28. Thus, the rear basket hoop 28 pivots upwardly while the pair of primary sidewall assembly rear sidewall links pivot downwardly. The weight of the rear basket hoop 28 locks the pair of primary sidewall assembly rear sidewall links at a nonparallel angle to the primary sidewall assembly rear floor crossbar supports 22. The rear frame 30 also has a right rear frame handle joint 35 and a left rear frame handle joint 36 that both connect to the handle 50. The joints of the rear frame 30 are preferably rivet connections on the pair of rear frame side vertical members 39.

The front frame 40 has a front frame left lower joint 41 and a front frame right lower joint 42 that can both pivotally connect to the front floor member 12 and also the secondary sidewall assembly front link 62. The front frame left upper pivot joint 43 is pivotally connected to the primary sidewall assembly left front primary sidewall link 25. The front frame right upper joint 44 is pivotally connected to the primary sidewall assembly right front primary sidewall link 27.

The front frame 40 has generally the same structure as the rear frame 30 including a front frame upper horizontal member 45, above a front frame lower horizontal member 46. A front frame left vertical member 47 and a front frame right vertical member 48 are both connected to the front frame upper horizontal member 45 and the front frame lower horizontal member 46. Again, the pair of vertical members receive the pivot joints.

As seen in the figures and as called out in FIGS. 5, 6 the handle 50 is described previously as pivotally connected to the rear frame 30. The handle 50 has a handle extension 51 that extends from the right rear frame handle joint 35 and the left rear frame handle joint 36. The handle 50 preferably includes a handle grip 55 and a handle cross brace 56 connected across the pair of handle extensions 51. The left handle joint 53 and the right handle joint 54 can be formed as plastic members that have sockets for receiving the pair of handle extensions 51 and coupling the pair of handle extensions 51 to the handle grip 55. The handle 50 is supported by a handle support that has a handle support upper section 57 and a handle support lower section 58. A handle support joint 59 connects the handle support upper section 57 to the handle support lower section 58. The handle support joint 59 is formed as an elbow joint that locks at a particular angle where the handle support upper section 57 has rotated to near or past 180° from the handle support lower section 58. The handle support lower section is pivotally connected to the rear frame 30. The handle support joint 59 can also be pivotally connected to the rear basket hoop supports 29.

The secondary sidewall assembly 60 has a secondary sidewall assembly rear link 61 connected to a secondary sidewall assembly front link 62. The secondary sidewall assembly rear link 61 is pivot jointed to a secondary sidewall assembly rear link joint 63. Similarly, the secondary sidewall assembly front link 62 is pivot jointed to the secondary sidewall assembly front link joint 64. The secondary sidewall assembly rear link joint 63 can be spaced apart from or coincidental with the secondary sidewall assembly front link joint 64.

The primary sidewall assembly forms a V shape and is connected to the secondary sidewall assembly. The secondary sidewall assembly rear link 61 has a pair of secondary sidewall assembly rear scissor joints 65 connecting to the primary sidewall assembly rear floor crossbar supports 22. Similarly, the secondary sidewall assembly front link 62 has a pair of secondary sidewall assembly front scissor joints 66 connecting to the primary sidewall assembly front floor crossbar supports.

Figure 8:
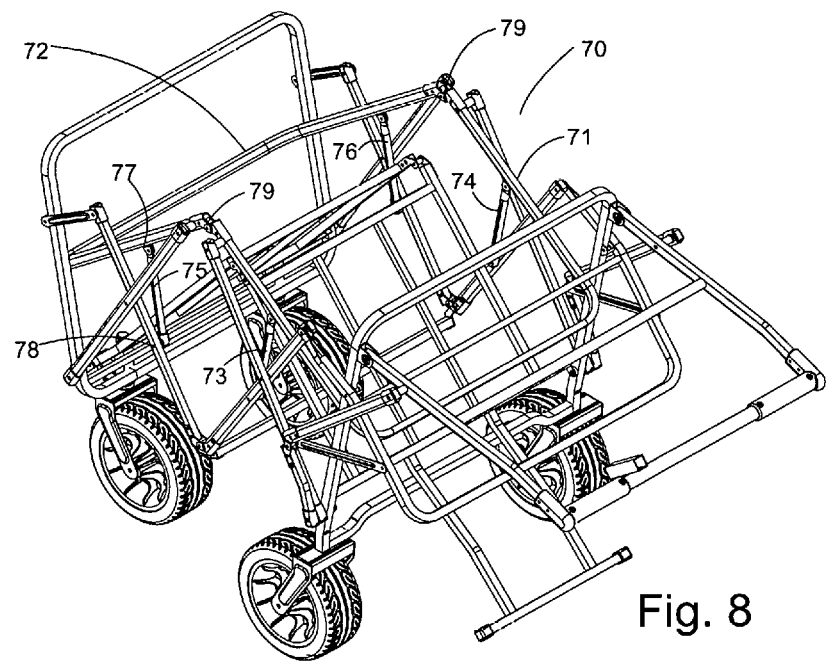
FIG. 8 is a perspective view of the folding cart and a half folded configuration.
Figures 9, 10:
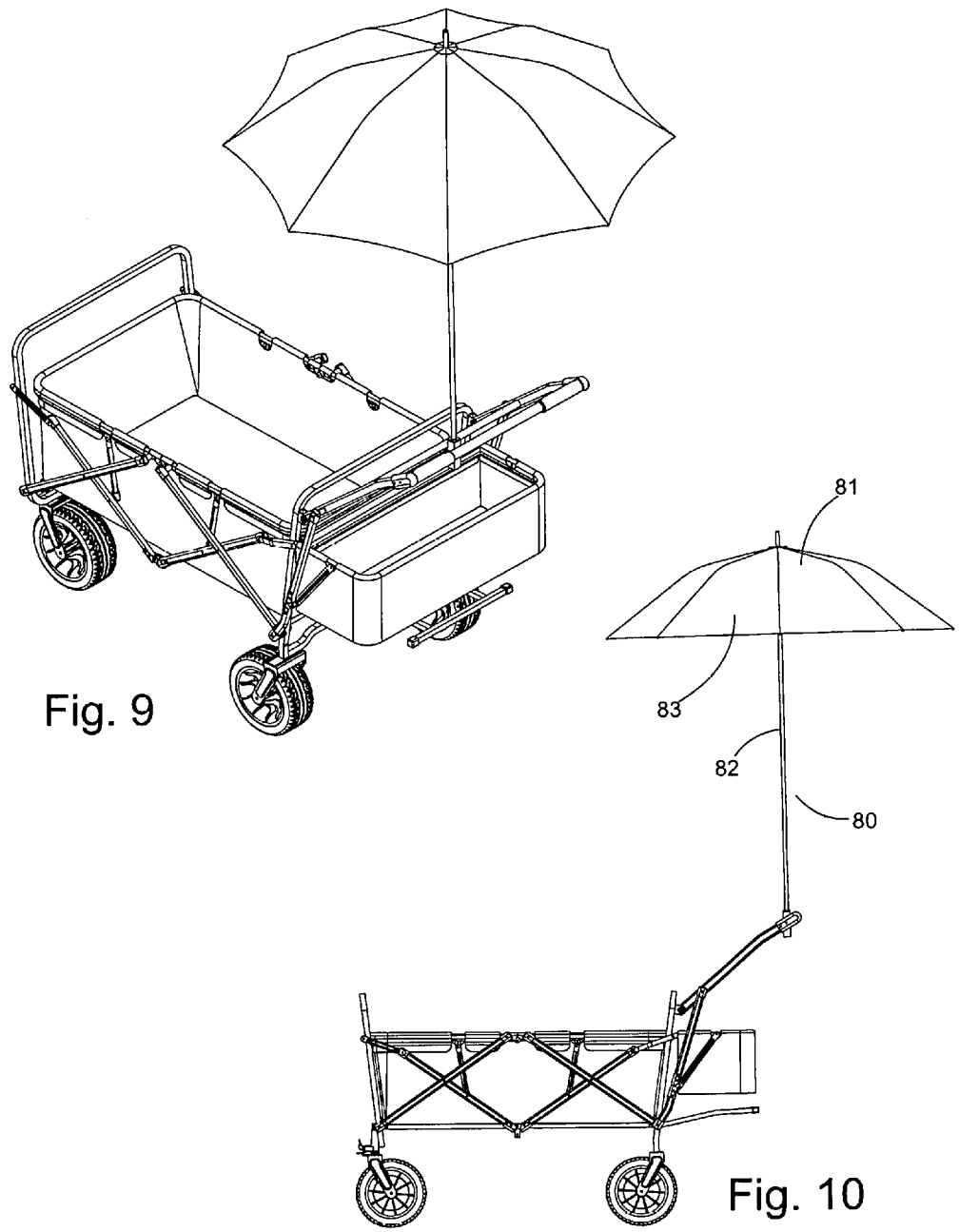
FIG. 9 is a perspective view of the folding cart with the umbrella and fabric members attached, including the main basket fabric member and the rear basket fabric member.
FIG. 10 is a side view of the folding cart with the umbrella and fabric members attached.

As called out in FIG. 8, the primary and secondary sidewall assemblies preferably support a main basket 70. The main basket 70 is formed of a rear main basket member 71 hinged to a front main basket member 72 at a main basket middle joint 79. The main basket middle joint 79 is limited to a 180° angle. The rear main basket member 71 has a main basket rear left support 73 and a main basket rear right support 74. The front main basket member 72 has a main basket front left support 75 and a main basket front right support 76. The main basket supports are pivotally connected at a main basket support upper joint 77 and a main basket support lower joint 78. The main basket support lower joint 78 is mounted to the primary sidewall assembly 20 and the main basket support upper joint 77 is mounted to the main basket 70. The main basket support lower joints 78 of the main basket rear left support 73 and the main basket rear right support 74 are pivotally connected to the primary sidewall assembly rear floor crossbar supports 22 at a location lower than the secondary sidewall assembly rear scissor joints 65. The main basket support lower joints 78 of the main basket front left support 75 and the main basket front right support 76 are pivotally connected to the primary sidewall assembly front floor crossbar supports 23 at a location lower than the secondary sidewall assembly front scissor joints 66.

The umbrella provides shade for user. The umbrella 80 is preferably mounted to the umbrella holder 52. The umbrella holder 52 is preferably welded to the handle grip 55. The umbrella 80 includes an umbrella mast 82 extending upward to an umbrella canopy 81. The umbrella canopy preferably has a number of umbrella panels 83. A stowage handle 84 has a stowage handle strap 85. The stowage handle strap 85 is connected to the floor assembly 10 at either the rear floor member 11 or the front floor member 12.

Figure 11:
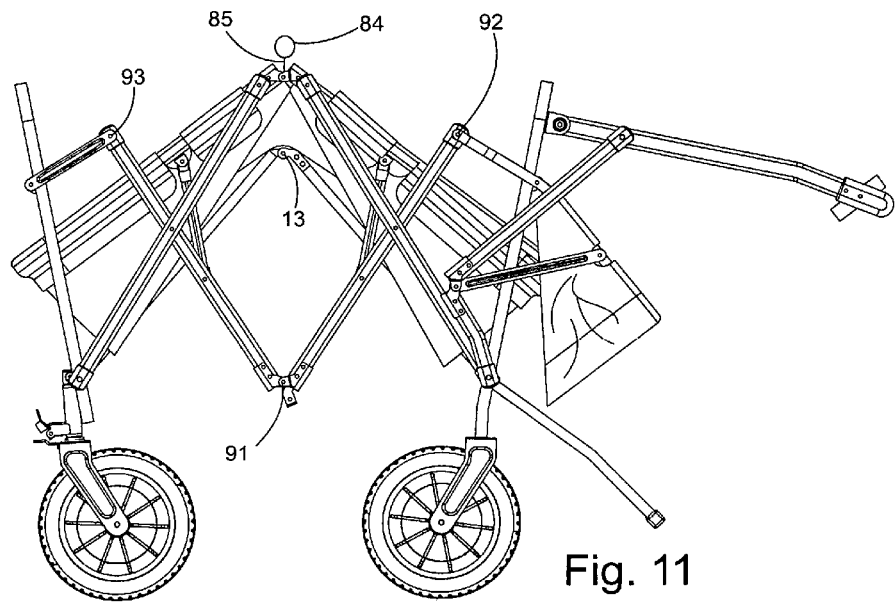
FIG. 11 is a side view of the folding cart in a half folded configuration with the fabric members attached and showing the handle and handle strap.
Figure 12:
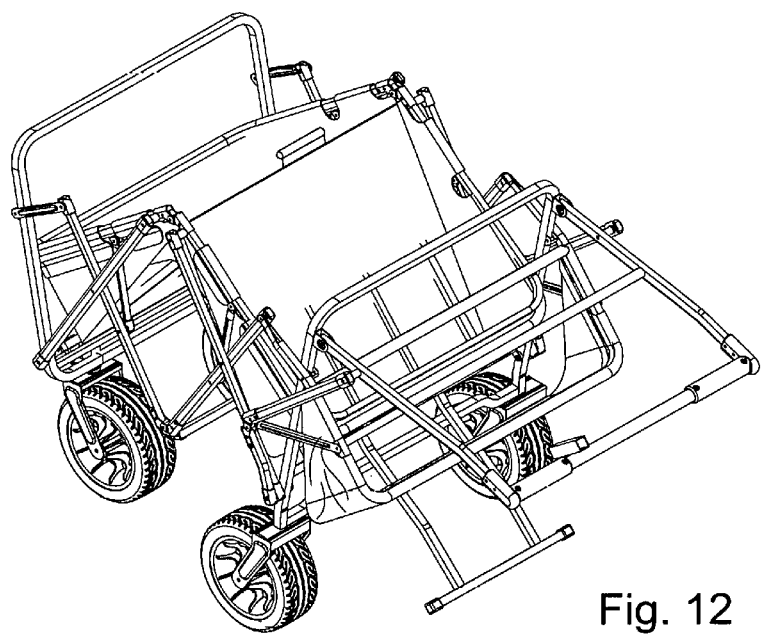
FIG. 12 is a perspective view of the folding cart in a half folded configuration with the fabric members attached and showing the handle and handle strap.

As called out in FIG. 11, the primary sidewall middle joint 91 connects the primary sidewall assembly rear floor crossbar supports 22 to the primary sidewall assembly front floor crossbar supports 23. The primary sidewall assembly left rear sidewall link 24 and the primary sidewall assembly right rear sidewall link 26 are pivotally connected to the primary sidewall assembly rear floor crossbar supports 22. The primary sidewall front joint 93 connects the primary sidewall assembly left front sidewall link 25 and the primary sidewall assembly right front sidewall link 27 to the pair of primary sidewall assembly front floor crossbar supports 23.

After taking into consideration all of the structure recited above, the drawings show a system of mechanisms that provide multiple locking joints for maintaining the cart in a deployed position. The rear frame 30 forms a four bar mechanism with the primary sidewall assembly rear floor crossbar supports 22, the primary sidewall assembly rear sidewall links, the rear frame side vertical members 39, and the secondary sidewall assembly rear links 61. Analogously, the front frame 40, forms a four bar mechanism with the front crossbar supports 23, the primary sidewall assembly front sidewall links, the front frame vertical members, and the secondary sidewall assembly front links 62. These four bar mechanisms are located at the rear and front of the cart and are both connected to a middle four bar mechanism which is formed from the connection of the secondary sidewall assembly rear link 61, the secondary sidewall assembly front link the two, the primary sidewall assembly rear floor crossbar supports 22 and the primary sidewall assembly front floor crossbar supports 23. Thus, three connected four bar mechanisms deploy for locking the floor in the deployed position.

In operation, the primary locking mechanism is preferably where the middle floor joint 13 abuts the floor crossbar 14. Then, the three four bar mechanisms of the primary sidewall assembly and the secondary sidewall assembly form a second locking mechanism that secures the primary locking mechanism. Additionally, the folding handle 50 is a third locking mechanism that locks and unlocks with a locking pivot, namely the handle support joint 59. When the handle support joint 59 is in a locked position like a locked knee of a human, the downward weight of the handle 50 retains the rear basket hoop 28, which in turn retains the primary sidewall assembly rear sidewall links 24, 26 which in turn retain the primary sidewall assembly rear floor crossbar supports 22 of the primary sidewall assembly 20. Accordingly, the primary locking mechanism is secured by the secondary locking mechanism which is in turn secured by the third locking mechanism.

Optionally, the wheels can pivot and can have wheel pivots 94. The wheel pivots 94 preferably have wheel pivot locking latches 95 for selective engagement of wheel pivoting function.

When a user is pushing the cart, the front is the side away from the user, and when the user is pulling the cart, the front is the end towards the user. Front and rear refer to the direction of travel and invert when the direction of travel is reversed. Therefore, the element names having front and rear designations, can be interchanged when direction of travel is reversed.

The advantage of the present invention is that the configuration provides improved locking over the prior art to maintain the car in open position, and the disadvantage of the present invention is that the configuration is more complicated and requires more parts. However, the cost attributable to the additional complication is low relative to the improved functionality and strength of the present invention.

The invention claimed is:

1. A locking floor folding cart comprising:
   a. a pair of front wheels;
   b. a pair of rear wheels;
   c. a folding frame including:
      i. a front frame supported by the pair of front wheels, and a rear frame supported by the pair of rear wheels;
      ii. a front floor member hinged to a rear floor member at a middle floor joint, wherein the front floor member is also hinged to the front frame, and wherein the rear floor member is also hinged to the rear frame;
      iii. a floor crossbar supporting the middle floor joint, the front floor member, and the rear floor member;
      iv. a primary sidewall assembly supporting the floor crossbar, wherein the primary sidewall assembly includes a front floor crossbar support and a rear floor crossbar support, wherein the front floor crossbar support is hinged to the rear floor crossbar support at a floor crossbar connector, wherein the floor crossbar connector is connected to the floor crossbar; wherein the primary sidewall assembly further includes a pair of primary sidewall assembly front links and a pair of primary sidewall assembly rear links, wherein the pair of primary sidewall assembly front links are pivotally connected to the front frame at front frame upper joints and connected to the front floor crossbar supports at primary sidewall front joints, and wherein the pair of primary sidewall rear links are pivotally connected to the rear frame at rear frame upper joints and connected to the rear floor crossbar supports at primary sidewall rear joints; wherein the
      v. a secondary sidewall assembly supporting the primary sidewall assembly, wherein the secondary sidewall assembly includes a secondary sidewall assembly front link and a secondary sidewall assembly rear link, wherein the secondary sidewall assembly front link is pivotally connected to the front frame at front frame lower joints, and wherein the secondary sidewall assembly rear link is pivotally connected to the rear frame at rear frame lower joints, wherein the front frame upper joints are mounted above the front frame lower joints, wherein the rear frame upper joints are mounted above the rear frame lower joints, wherein the folding frame has a folded position and a deployed position, further including: a rear basket hoop pivotally mounted to a right rear frame handle joint and a left rear frame handle joint, wherein the rear basket hoop extends from the pair of primary sidewall assembly rear links, wherein the rear basket hoop is rigidly connected to the pair of primary sidewall assembly rear links.

2. The locking floor folding cart of claim 1, further including: a rear basket hoop support supporting the rear basket hoop.

3. The locking floor folding cart of claim 2, further including: a handle support joint supporting the rear basket hoop support and pivotally connected to the rear basket hoop support, wherein the handle support joint is pivotally connected to a handle support upper section above the handle support joint and a handle support lower section below the handle support joint, wherein the handle support upper section is pivotally connected to a handle for supporting the handle, and wherein the handle support lower section is pivotally connected to the rear frame at a location below the handle support joint.

4. The locking floor folding cart of claim 3, wherein: the handle pivotally is mounted to the rear frame at a right rear frame handle joint and a left rear frame handle joint, wherein the handle includes a pair of handle extensions connected by a handle grip, wherein a left handle joint connects to a left end of the handle grip and right handle joint connects to a right end of the handle grip.

5. The locking floor folding cart of claim 1, further including: a handle pivotally mounted to the rear frame at a right rear frame handle joint and a left rear frame handle joint, a handle support joint supporting the rear basket hoop support and pivotally connected to the rear basket hoop support, wherein the handle support joint is pivotally connected to a handle support upper section above the handle support joint and a handle support lower section below the handle support joint, wherein the handle support upper section is pivotally connected to a handle for supporting the handle, and wherein the handle support lower section is pivotally connected to the rear frame at a location below the handle support joint.

6. The locking floor folding cart of claim 5, wherein the handle support joint locks at an angle where the handle support upper section and the handle support lower section are generally parallel to each other, wherein the handle support joint is pivotally connected to a rear basket hoop support, wherein the rear basket hoop support supports a rear basket hoop, wherein the rear basket hoop is pivotally connected to the rear frame, wherein the rear basket hoop extends from the pair of primary sidewall assembly rear links, wherein the rear basket hoop forms a first locking four bar mechanism with the rear frame, the rear basket hoop supports, and the handle support lower section, wherein the first locking four bar mechanism can fold to the folded position and deploy to the deployed position.

7. A locking floor folding cart comprising:
   a. a pair of front wheels;
   b. a pair of rear wheels;
   c. a folding frame including:
      i. a front frame supported by the pair of front wheels, and a rear frame supported by the pair of rear wheels;
      ii. a front floor member hinged to a rear floor member at a middle floor joint, wherein the front floor member is also hinged to the front frame, and wherein the rear floor member is also hinged to the rear frame;
      iii. a floor crossbar supporting the middle floor joint, the front floor member, and the rear floor member;
      iv. a primary sidewall assembly supporting the floor crossbar, wherein the primary sidewall assembly includes a front floor crossbar support and a rear floor crossbar support, wherein the front floor crossbar support is hinged to the rear floor crossbar support at a floor crossbar connector, wherein the floor crossbar connector is connected to the floor crossbar; wherein the primary sidewall assembly further includes a pair of primary sidewall assembly front links and a pair of primary sidewall assembly rear links, wherein the pair of primary sidewall assembly front links are pivotally connected to the front frame at front frame upper joints and connected to the front floor crossbar supports at primary sidewall front joints, and wherein the pair of primary sidewall rear links are pivotally connected to the rear frame at rear frame upper joints and connected to the rear floor crossbar supports at primary sidewall rear joints; wherein the v. a secondary sidewall assembly supporting the primary sidewall assembly, wherein the secondary sidewall assembly includes a secondary sidewall assembly front link and a secondary sidewall assembly rear link, wherein the secondary sidewall assembly front link is pivotally connected to the front frame at front frame lower joints, and wherein the secondary sidewall assembly rear link is pivotally connected to the rear frame at rear frame lower joints, wherein the front frame upper joints are mounted above the front frame lower joints, wherein the rear frame upper joints are mounted above the rear frame lower joints, wherein the folding frame has a folded position and a deployed position, further including: a foot stand having a pair of foot stand extensions and a foot stand extension crossbar, wherein the foot stand extends from and is rigidly connected to the rear floor member, wherein the foot stand is pivotally connected to the rear frame.

8. The locking floor folding cart of claim 7, further including: a rear basket hoop pivotally mounted to a right rear frame handle joint and a left rear frame handle joint, wherein the rear basket hoop extends from the pair of primary sidewall assembly rear links, wherein the rear basket hoop is rigidly connected to the pair of primary sidewall assembly rear links.

9. The locking floor folding cart of claim 8, further including: a rear basket hoop support supporting the rear basket hoop, and wherein the primary sidewall assembly rear floor crossbar supports angle upward from the floor crossbar connector to the primary sidewall assembly rear sidewall links, wherein the primary sidewall assembly rear sidewall links are pivotally connected to the rear frame, wherein the rear frame is pivotally connected to the secondary sidewall assembly rear link, wherein the secondary sidewall assembly rear link is pivotally connected to the primary sidewall assembly rear links.

10. The locking floor folding cart of claim 9, further including: a handle support joint supporting the rear basket hoop support and pivotally connected to the rear basket hoop support, wherein the handle support joint is pivotally connected to a handle support upper section above the handle support joint and a handle support lower section below the handle support joint, wherein the handle support upper section is pivotally connected to a handle for supporting the handle, and wherein the handle support lower section is pivotally connected to the rear frame at a location below the handle support joint.

11. The locking floor folding cart of claim 10, wherein: the handle pivotally is mounted to the rear frame at a right rear frame handle joint and a left rear frame handle joint, wherein the handle includes a pair of handle extensions connected by a handle grip, wherein a left handle joint connects to a left end of the handle grip and right handle joint connects to a right end of the handle grip.

12. The locking floor folding cart of claim 7, further including: a handle pivotally mounted to the rear frame at a right rear frame handle joint and a left rear frame handle joint,. a handle support joint supporting the rear basket hoop support and pivotally connected to the rear basket hoop support, wherein the handle support joint is pivotally connected to a handle support upper section above the handle support joint and a handle support lower section below the handle support joint, wherein the handle support upper section is pivotally connected to a handle for supporting the handle, and wherein the handle support lower section is pivotally connected to the rear frame at a location below the handle support joint.

13. The locking floor folding cart of claim 12, wherein the handle support joint locks at an angle where the handle support upper section and the handle support lower section are generally parallel to each other, wherein the handle support joint is pivotally connected to a rear basket hoop support, wherein the rear basket hoop support supports a rear basket hoop, wherein the rear basket hoop is pivotally connected to the rear frame, wherein the rear basket hoop extends from the pair of primary sidewall assembly rear links, wherein the rear basket hoop forms a first locking four bar mechanism with the rear frame, the rear basket hoop supports, and the handle support lower section, wherein the first locking four bar mechanism can fold to the folded position and deploy to the deployed position.

14. The locking floor folding cart of claim 13, further including a main basket having a rear main basket member and a front main basket member, wherein the rear main basket member is supported by a pair of main basket rear supports, wherein the front main basket member is supported by a pair of main basket front supports, wherein the pair of main basket rear supports are pivotally connected to the primary sidewall assembly rear floor crossbar supports, and wherein the pair of main basket front supports are pivotally connected to the primary sidewall assembly front crossbar supports.

15. The locking floor folding cart of claim 13, wherein the main basket is connected at a secondary sidewall assembly middle joint, wherein the front main basket member and the rear main basket member are connected together pivotally at the secondary sidewall assembly middle joint, wherein the secondary sidewall assembly middle joint is supported by the secondary sidewall assembly front link and the secondary sidewall assembly rear link.

* * * * *